(12) United States Patent
Ramoiu

(10) Patent No.: US 11,827,191 B2
(45) Date of Patent: Nov. 28, 2023

(54) PREVENTING AUTOMATIC LEVELING DURING BATTERY REPLACEMENT

(71) Applicant: Continental Teves AG & Co. OHG, Frankfurt am Main (DE)

(72) Inventor: Radu Andrei Ramoiu, Sibiu (RO)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 418 days.

(21) Appl. No.: 17/309,570

(22) PCT Filed: Dec. 4, 2019

(86) PCT No.: PCT/EP2019/083592
§ 371 (c)(1),
(2) Date: Jun. 4, 2021

(87) PCT Pub. No.: WO2020/115091
PCT Pub. Date: Jun. 11, 2020

(65) Prior Publication Data
US 2022/0024424 A1    Jan. 27, 2022

(30) Foreign Application Priority Data

Dec. 6, 2018 (GB) ...................................... 1819893

(51) Int. Cl.
*B60S 5/06* (2019.01)
*B60G 17/005* (2006.01)
*B60G 17/0195* (2006.01)

(52) U.S. Cl.
CPC .............. *B60S 5/06* (2013.01); *B60G 17/005* (2013.01); *B60G 17/0195* (2013.01);
(Continued)

(58) Field of Classification Search
USPC ................. 320/106, 107, 108, 109, 110, 112
See application file for complete search history.

(56) References Cited

U.S. PATENT DOCUMENTS

| 9,643,574 B2 | 5/2017 | King |
| 2010/0052272 A1 | 3/2010 | Beilmann |

(Continued)

FOREIGN PATENT DOCUMENTS

| CN | 101610926 A | 12/2009 |
| CN | 105122074 A | 12/2015 |

(Continued)

OTHER PUBLICATIONS

Great Britain Combined Search and Examination Report dated May 29, 2019 for the counterpart Great Britain Patent Application No. GB1819893.7.

(Continued)

*Primary Examiner* — Brian Ngo

(57) ABSTRACT

The invention refers to a method of preventing automatic leveling during battery replacement, and a computer-program thereof. The method of preventing automatic leveling during battery replacement, according to invention, operates for an electric vehicle equipped with a first electronic control unit (100) in charge with battery replacement and a second electronic control unit (200) of suspension system, the respective ECUs (100, 200) communicating by means of an internal bus system. The method includes the following steps: (51) Sending an information from the first ECU to the second ECU that the vehicle is prepared to perform a battery replacement; (52) Once said information is received by the second ECU, triggering a leveling forbid flag to the suspension system and deactivating it; (53) Once said deactivation has been performed, setting a feedback signal to inform that battery replacement can commence; (54) during battery replacement, setting said feedback signal to inform that battery replacement is ongoing; (55) Upon completion of battery replacement, informing the second ECU that the (Continued)

battery replacement has been finished successfully, and allowing the activation of suspension.

4 Claims, 1 Drawing Sheet

(52) U.S. Cl.
CPC ...... *B60G 2204/46* (2013.01); *B60G 2300/50* (2013.01); *B60G 2800/914* (2013.01); *B60Y 2306/15* (2013.01)

(56) References Cited

U.S. PATENT DOCUMENTS

| | | | |
|---|---|---|---|
| 2014/0309911 A1 | | 10/2014 | Le et al. |
| 2017/0151881 A1 | | 6/2017 | Lee |
| 2017/0225662 A1 | | 8/2017 | Newman et al. |
| 2020/0198494 A1 | * | 6/2020 | Chen ................. B60L 53/66 |
| 2021/0051868 A1 | * | 2/2021 | Redmond ............ A01G 25/167 |

FOREIGN PATENT DOCUMENTS

| | | | |
|---|---|---|---|
| CN | 106314178 A | * | 1/2017 |
| DE | 102008031056 A1 | | 2/2009 |
| DE | 102015109962 A1 | * | 12/2015 ............ G01R 31/36 |
| GB | 1449769 A | | 9/1976 |
| GB | 2460500 A | | 12/2009 |
| JP | 2007055415 A | | 3/2007 |
| JP | 2007238033 A | | 9/2007 |
| JP | 2008273371 A | | 11/2008 |
| JP | 2017095028 A | | 6/2017 |
| JP | 2017202749 A | | 11/2017 |
| KR | 20030020617 A | | 3/2003 |

OTHER PUBLICATIONS

International Search Report and the Written Opinion of the International Searching Authority dated Mar. 12, 2020 for the counterpart PCT Application No. PCT/2019/083592.
Great Britain Intention to Grant dated Apr. 8, 2021 for the counterpart Great Britain Patent Application No. GB1819893.7.
Korean Decision for Grant dated Mar. 20, 2023 for the counterpart Korean Application No. 10-2021-7012755.
Chinese Office Action dated Apr. 15, 2023 for the counterpart Chinese Patent Application No. 21980076431.7.
Decision to Grant a Patent drafted Apr. 21, 2023 for the counterpart Japanese Patent Application No. 2021-524073.
Japanese Office Action dated Jun. 17, 2022 for the counterpart Japanese Patent Application No. 2021-524073.

* cited by examiner

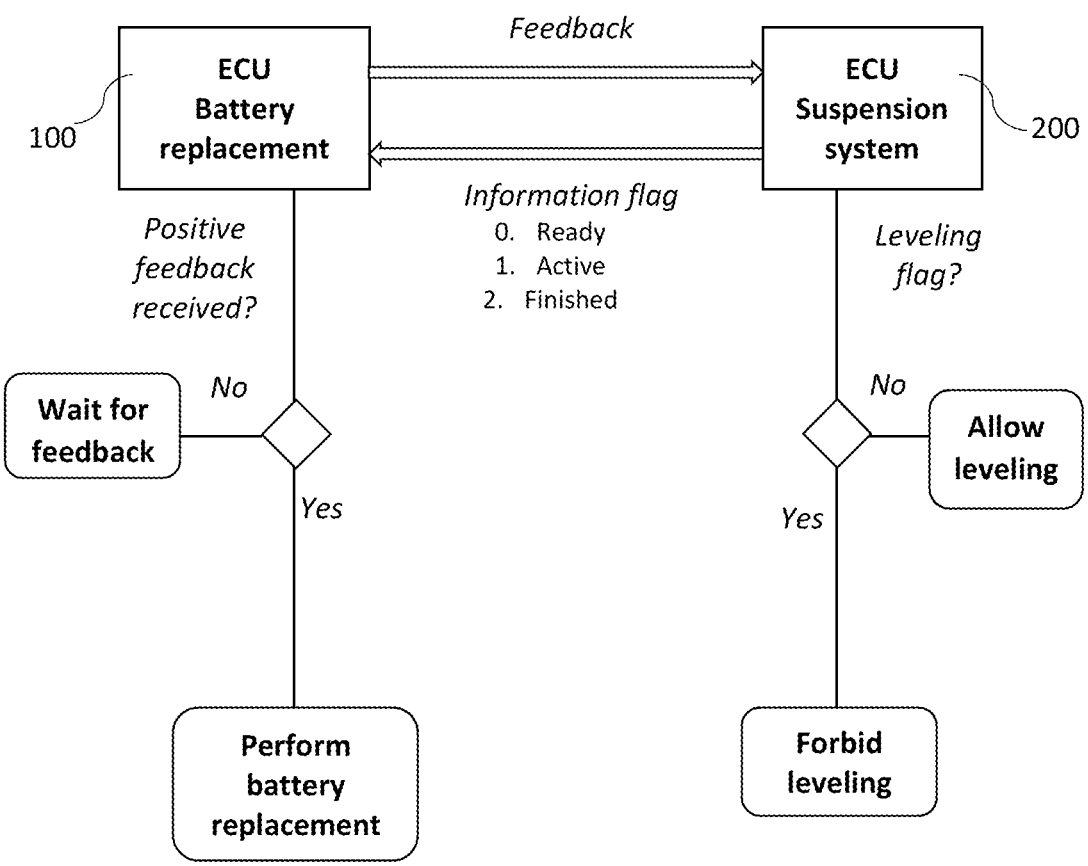

PREVENTING AUTOMATIC LEVELING DURING BATTERY REPLACEMENT

CROSS-REFERENCE TO RELATED APPLICATIONS

This patent application is a National Stage Application under 35 U.S.C. 371 of International Application No. PCT/EP2019/083592 filed on Dec. 4, 2019, which claims priority from GB 1819893.7 filed on Dec. 6, 2018, in the Intellectual Property Office of the United Kingdom, the disclosures of which are herein incorporated by reference in their entireties.

BACKGROUND

1. Field

Embodiments of the present application relate to a method and an associated computer program of preventing automatic levelling during battery replacement for electric vehicles.

2. Description of Related Art

In the emerging era of electric vehicles, it is known that automated system will be used in gas stations or garage as to replace the entire battery (located under the bottom of the car) with a brand new, fully charge battery within minutes. For example, U.S. Pat. No. 9,643,574B2 describes such an apparatus for energy storage device exchange and rapid charging; also, US 2017225662A1 describes a vehicle battery replacement system with a plurality of battery replacement stations for replacing depleted battery pack of an electric vehicle with a charged battery pack.

Even though the main battery of the car is removed, the vehicle still may have in use an available reserve (a small 12V battery, for example), keeping all the systems and functionalities of the car alive. Nevertheless, along with this new technology, many safety issues may occur, one of them being the inadequate activation of an electrical air suspension during the battery replacement. Air spring suspension is capable of automatic levelling by lifting or lowering the vehicle in multiple cases, one of them being the detection of load changes. Or, by removing the battery, a significant mass will be released from vehicle. In this scenario the pressure changes in all air springs, and the suspension will adjust this pressure change by lowering the vehicle. However, any movement during the removal of the old battery or placing the new battery can cause significant damage.

For this reason, there is a need to prevent automatic levelling during battery replacement and to allow the commencement of it only after the safety of such an operation is checked.

Therefore, aspects of the present application may achieve operational safety during battery replacement.

SUMMARY

According to an aspect of the present application, operational safety during battery replacement may be achieved by the subject matters of the independent claims, namely a method of preventing automatic levelling during battery replacement, as well as an associated computer program.

Further advantageous embodiments are the subject matter of the dependent claims.

A first aspect of the present application is a method of preventing automatic levelling during battery replacement, operating for an electric vehicle equipped with a first electronic control unit in charge with battery replacement and a second electronic control unit of suspension system, the respective ECUs communicating by means of an internal bus system, whereby the method includes the following steps: sending an information from the first ECU to the second ECU that the vehicle is prepared to perform a battery replacement; once said information is received by the second ECU, triggering a levelling forbid flag to the suspension system and deactivating it; once said deactivation has been performed, setting a feedback signal to inform that battery replacement can commence; during battery replacement, setting said feedback signal to inform that battery replacement is on going; upon completion of battery replacement, informing the second ECU that the battery replacement has been finished successfully, and allowing the activation of suspension.

The immediate and direct advantage of invention is that it requires no additional external hardware or physical components, other than those already installed on electric vehicles; plus, it can be implemented with extremely low costs. Moreover, extensive benefits are associated to the inventive method, namely: it prevents accidents in case of human presence; the level of vehicle safety is increased; it protects also the automated system of battery replacement.

A second aspect of this application is a computer program that integrates as code lines the mentioned method of preventing automatic levelling during battery replacement.

The advantage of using such a computer program consists into automatization and versatility of implementation.

BRIEF DESCRIPTION OF THE DRAWINGS

Further special features and advantages can betaken from the following description of advantageous embodiment by way of the accompanying drawings, in which:

FIG. 1 illustrates the flow chart of an embodiment of the method.

DETAILED DESCRIPTION

Referring now to FIG. 1, a first ECU 100 in charge with battery replacement informs a second ECU 200 of suspension system by the internal bus system (for example, Flexray or CAN) that the vehicle is prepared and ready to perform a battery change. Once this information is received by the second ECU 200, it triggers a levelling forbid flag to the entire suspension system, blocking temporarily all levelling and pressure compensations. Once the deactivation has been performed, a feedback signal is set, informing that the battery replacement process can commence. During the battery replacement, the feedback signal is set accordingly, as to reflect the fact that battery replacement is ongoing. Upon completion of battery replacement, the feedback signal, again set accordingly, informs the second ECU 200 that battery replacement has been finished successfully, allowing the activation of the electrical suspension, which will immediately trigger a pressure compensation adjusting the vehicle's height to match the load of the replaced battery.

Preventing automatic levelling method implies inserting corresponding code lines into the software programs running on said electronic control units, as to be able to communicate by sending and receiving said information and feedback signals and to activate the respective systems to perform battery replacement and/or automatic levelling, according to the inventive method.

While certain embodiments have been described in detail, those familiar with the art to which this invention relates will recognize various alternative designs and embodiments as defined by the following claims.

The invention claimed is:

1. A method of preventing automatic leveling during battery replacement, operating for an electric vehicle equipped with a first electronic control unit in charge with batter replacement and a second electronic control unit of a suspension system, the first electronic control unit and the second electronic control unit communicating by means of an internal bus system, the method comprising:
   sending information from the first electronic control unit to the second electronic control unit that the vehicle is prepared to perform a battery replacement;
   in response to the information received by the second electronic control unit, triggering a leveling forbid flag to the suspension system and deactivating the automatic leveling;
   in response to deactivating the automatic leveling, setting a feedback signal to inform that battery replacement can commence;
   during battery replacement, setting said feedback signal to inform that battery replacement is ongoing; and
   in response to completion of battery replacement, informing the second electronic control unit that the battery replacement has been finished successfully, and activating the automatic leveling.

2. The method according to claim 1, wherein deactivating the automatic leveling comprises temporarily blocking all leveling and pressure compensations of the suspension system.

3. The method according to claim 2, wherein the activating comprises triggering a pressure compensation.

4. A non-transitory computer-readable recording medium having embodied thereon a computer program that when executed by a first electronic control unit and a second electronic control unit causes an electric vehicle equipped with a first electronic control unit in charge with battery replacement and a second electronic control unit of a suspension system, the first electronic control unit and the second electronic control unit communicating by means of an internal bus system, to perform a method of preventing automatic leveling during battery replacement, the method comprising;
   sending information from the first electronic control unit to the second electronic control unit that the vehicle is prepared to perform a battery replacement,
   in response to the information received by the second electronic control unit, triggering a leveling forbid flag to the suspension system and deactivating the automatic leveling;
   in response to deactivating the automatic leveling, setting a feedback signal to inform that battery replacement can commence;
   during battery replacement, setting said feedback signal to inform that battery replacement is ongoing; and
   in response to completion of battery replacement, informing the second electronic control unit that the batter replacement has been finished successfully, and activating the automatic leveling.

* * * * *